(12) United States Patent
Specht et al.

(10) Patent No.: US 9,701,276 B2
(45) Date of Patent: Jul. 11, 2017

(54) DRIVE DEVICE FOR LIFTING A VEHICLE ENGINE HOOD ADAPTED TO PROTECT PEDESTRIAN

(71) Applicant: Key Safety Systems, Inc., Sterling Heights, MI (US)

(72) Inventors: Martin Specht, Feldafing (DE); Thomas Schrott, Feldafing (DE)

(*) Notice: Subject to any disclaimer, the term of this patent is extended or adjusted under 35 U.S.C. 154(b) by 0 days.

(21) Appl. No.: 14/653,948

(22) PCT Filed: Dec. 20, 2013

(86) PCT No.: PCT/IB2013/002846
§ 371 (c)(1),
(2) Date: Jun. 19, 2015

(87) PCT Pub. No.: WO2014/096943
PCT Pub. Date: Jun. 26, 2014

(65) Prior Publication Data
US 2015/0343990 A1 Dec. 3, 2015

(30) Foreign Application Priority Data
Dec. 21, 2012 (DE) .................. 20 2012 012 378 U

(51) Int. Cl.
*B60R 21/38* (2011.01)
*F15B 15/19* (2006.01)

(52) U.S. Cl.
CPC .............. *B60R 21/38* (2013.01); *F15B 15/19* (2013.01)

(58) Field of Classification Search
CPC .............. B60R 21/38; B60R 21/34; B60R 2021/01272; B60R 22/195; B60R 22/1955; F15B 15/19
See application file for complete search history.

(56) References Cited

U.S. PATENT DOCUMENTS 7,073,846 B2 * 7/2006 Borg .................. B60R 21/38
                                                  180/274
7,475,752 B2 * 1/2009 Borg .................. B60R 21/38
                                                  180/274
(Continued)

FOREIGN PATENT DOCUMENTS

EP       1090819 A1    5/2001
EP       1659038 A1    5/2006
(Continued)

*Primary Examiner* — Paul N Dickson
*Assistant Examiner* — Timothy Wilhelm
(74) *Attorney, Agent, or Firm* — Markell Seitzman

(57) ABSTRACT

The invention relates to a drive device for lifting a vehicle engine hood to protect pedestrians, said drive device comprising
a pressure pipe (1) in which a piston (2) which can be driven by a drive gas can be moved along a linear guideway (3),
a piston rod (4) connected to said piston (2), said piston rod (4) having a connection point (6) to be connected force-lockingly to a lifting gear for the engine hood at a rod portion (5) projecting beyond a first guideway end (11) of the pressure pipe,
a second connection point (7) disposed at the second guideway end (12) located opposite the first guideway end (11), for force-locking support of the pressure pipe on the vehicle body, wherein
said two connection points (6) and (7) are arranged at the pressure pipe (1) in line with the linear guideway (3) of the piston (2), and
a gas source (8) supplying the drive gas, said gas source (8) being disposed in a pressure pipe portion (9) which is at an angle to the linear guideway (3).

23 Claims, 5 Drawing Sheets

(56) References Cited

U.S. PATENT DOCUMENTS

| | | | | |
|---|---|---|---|---|
| 7,617,898 B2* | 11/2009 | Leong | ............... | B60R 21/38 180/69.2 |
| 7,861,818 B2* | 1/2011 | Boggess | ............ | B60R 21/38 180/274 |
| 8,196,507 B2* | 6/2012 | Schafer | ............. | B60R 21/38 180/274 |
| 8,544,271 B2* | 10/2013 | Dreyer | ............. | B60R 21/38 60/632 |
| 2008/0012187 A1* | 1/2008 | Bauman | ............ | F16F 9/0218 267/64.11 |
| 2008/0136140 A1* | 6/2008 | Karlsson | ............ | B60R 21/38 280/727 |

FOREIGN PATENT DOCUMENTS

| | | |
|---|---|---|
| GB | 2395693 A | 6/2004 |
| GB | 2432399 A | 5/2007 |
| JP | 2010236637 A | 10/2010 |
| WO | 2008/026423 A1 | 3/2008 |

* cited by examiner

DRIVE DEVICE FOR LIFTING A VEHICLE ENGINE HOOD ADAPTED TO PROTECT PEDESTRIAN

BACKGROUND AND SUMMARY OF THE INVENTION

The invention relates to a drive device for lifting a vehicle engine hood adapted to protect pedestrians, in particular a motor vehicle engine hood.

Raising the engine hood of a motor vehicle with the aid of a drive device, if necessary via a lifting gear, to form a wedge for the protection of pedestrians, is known from the prior art. It is necessary in this regard to provide the force conveyed by the drive device in an effective manner so that the engine hood is swiftly raised.

The object of the invention is to provide a drive device for lifting a vehicle engine hood, in particular the engine hood of a motor vehicle, for the protection of pedestrians, said drive device delivering the force which is necessary for the drive motion into the mountings of the drive device in a torque-free manner, at least at the beginning of the drive motion.

This object is achieved by the drive device specified in claim 1.

This drive device includes a pressure pipe in which a piston which can be driven by a drive gas can be moved along a linear guideway, A piston rod is connected to the piston, the piston rod having a rod portion projecting beyond a first guideway end of the pressure pipe. A connection point to be connected force-lockingly to a lifting gear for the engine hood is provided at this projecting rod portion. This connection point is preferably provided in the form of a receiver for a part of the lifting gear. Another connection point is provided at the second guideway end located opposite the first guideway end, said connection point being adapted for force-locking support of the pressure pipe on the vehicle body. This support is preferably provided at a motor vehicle part located underneath the engine hood.

The two connection points are arranged at the pressure pipe in line with the linear guideway of the piston. Owing to this arrangement of the two connection points in linear alignment with the guideway of the piston, the forces applied by the drive device to the drive gear of the engine hood are delivered torque-free when the piston is driven, at least at the beginning of the drive motion. The drive gas for the piston is supplied by a gas source disposed in a pressure pipe portion which is at an angle to the linear guideway. The piston is driven along the linear guideway in the pressure pipe by the drive gas discharged from the gas source, and the driving force is transferred via the piston rod and the connection point to the piston rod to raise the engine hood above the connected lifting gear. As already described, the transmission of force to the lifting gear is torque-free, at least at the beginning of the drive motion, due to the connection points being aligned with the linear guideway. The linear drive motion is translated by the lifting gear into the lifting movement of the engine hood.

It is preferable that a stop ring arranged around the piston rod be provided at the front end of the piston in the drive direction. This stop ring may preferably consist of a motion-damping material. In the front end position of the piston being driven, the stop ring is at least motion-damping. For that purpose, it may be made of a deformable material, in particular of an elastic material such as rubber or plastic. The stop ring may be in the form of an O-ring.

The pressure pipe may preferably be rounded at the first guideway end. This rounded portion is located in the region in which the pressure pipe end is in contact with the piston rod. Due to this rounded portion, the piston and the piston rod, which may preferably be of one-piece construction, adopt a slightly tilted position at the end of the drive motion, relative to the linear guideway for the piston in the pressure pipe. The rounded portion of the pressure pipe end prevents the pressure pipe end from cutting into the tilted piston rod. This ensures that the piston and the piston rod can be pressed back into their initial position when the pressure in the work chamber has dropped.

The gas source is preferably designed as an electrically ignitable gas generator. Due to the pressure pipe portion being arranged at an angle to the linear guideway of the pressure pipe, electrical contact with the electrically ignitable gas generator can be made in a simple manner, preferably at the end of the angled pressure pipe portion. A standard electrical plug-type connectors can be used for this purpose. The gas generator may preferably be designed as a pyrotechnical gas generator.

Instead of a plug connection, the gas generator can be electrically contacted by means of a lead wire connection, in which the electrical cable is guided through an at least liquid-tight through hole to the ignition device of the gas generator. The liquid-tight duct is tightly inserted into the end of the angled pressure pipe portion. The other end of the current-carrying cable can be connected at a suitable place in the motor vehicle to the source of current by means of a plug connection.

The electrical contacting point at the end of the angled pressure pipe portion may preferably be surrounded liquid-tightly by a sleeve, so that splash water cannot reach the electrical contacting point when the engine is being washed.

A sealing cap may be provided at the end of the pressure pipe at which the driving force is transferred to the lifting gear. This sealing cap is preferably connected securely by positive engagement to the projecting portion of the piston rod and may be disposed on the pressure pipe end with a press fit that is releasable during piston operation. The interior of the piston is thus protected against entry of liquid, in particular against water, when power washing the engine, since no liquid can pass through the gap between the piston rod and the pressure pipe. When the piston is being driven, the gas in front of the piston, in the drive direction, in particular air, is driven out through the gap between the piston rod and the pressure pipe, as the press fit between the sealing cap and the pressure pipe end is released.

A braking path formed by narrowing the cross-section of the pressure pipe, in particular by conically tapering the walls of the pipe, is preferably provided for the driven piston in front of the first guideway end in the drive direction of the piston. This prevents separation of the individual parts forming the drive device in the event of the gas source being accidentally activated in the uninstalled state, in particular in the event of the gas generator being ignited. Due to the narrowing cross-section of the pressure pipe, the piston is braked over a specific distance in such a way that it cannot escape from the pressure pipe. The cross-sectional narrowing of the pressure pipe may transition continuously into the rounded portion provided at the pressure pipe end.

As already mentioned in the foregoing, the piston and the piston rod are of one-piece construction. In that case, more particularly, the piston and the piston rod may be made of plastic, in particular of a fiber/plastic composite material. In order to meet the temperature requirements, the piston and the piston rod may be provided with a core made of a metal, preferably of steel. The core may be provided with connection apertures with which the plastic material can engage. The core may also be contoured to match the contours of the piston, the piston rod and the connection point.

When assembling the drive device, the piston with the pre-mounted piston rod is disposed inside the pipe through the one open end of the pipe forming the first guideway end. The gas source, in particular the gas generator, is mounted inside the pipe through the end of the angled pressure pipe portion and when an electrically ignitable gas generator is used, the electrical contacts can be provided in a simple manner by means of a plug connection at the end of the angled pressure pipe portion or by a lead wire connected at a suitable position in the vehicle. The ends of the pipe are subsequently rolled or bent.

BRIEF DESCRIPTION OF THE DRAWINGS

The invention shall now be described in more detail with reference to the Figures, in which.

DETAILED DESCRIPTION

Figure 1:
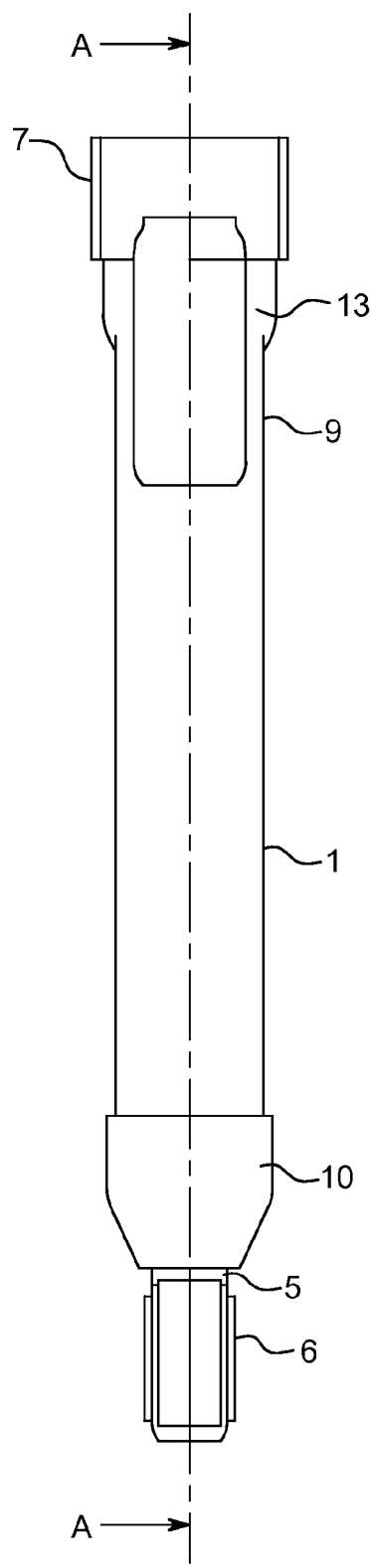
FIG. 1 shows a plan view of a first embodiment of the drive device.
Figure 4:
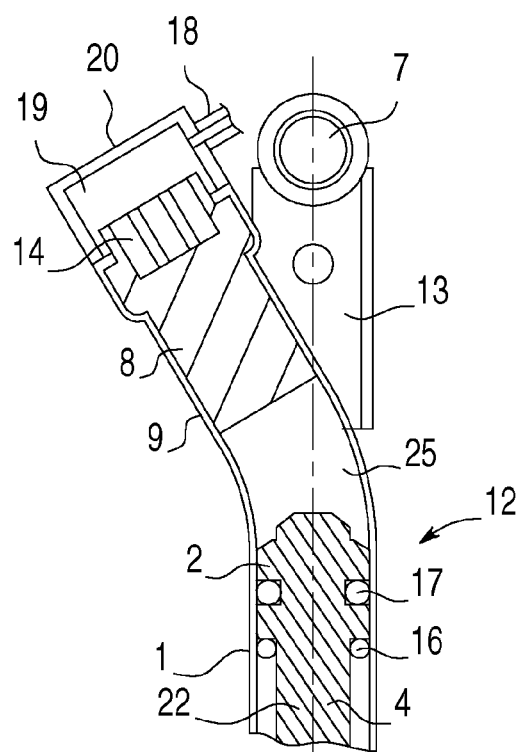
FIG. 4 shows a partial cross-sectional view of a third embodiment of the invention.
Figure 5:
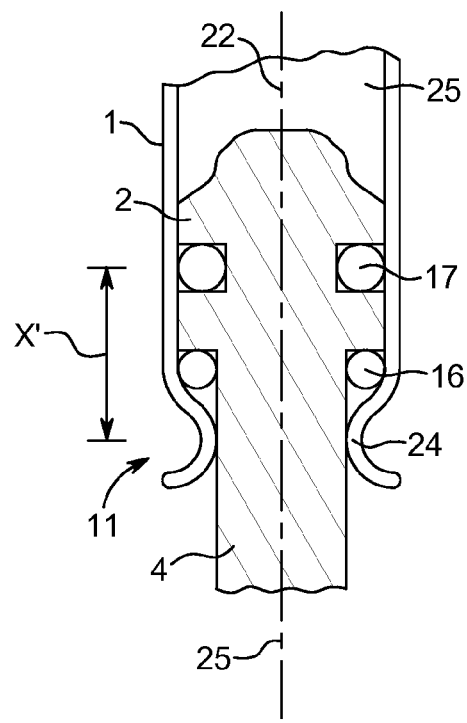
FIG. 5 shows a design for a pipe end that can be used in the embodiments.

The drive devices shown in the Figures are embodiments of the invention. They are used to raise the engine hood of a motor vehicle, more particularly to form a wedge shape, in order to protect pedestrians. The drive devices shown have a pressure pipe 1 having a pipe axis 22, in which a piston 2 which can be driven by a drive gas can be moved along a linear guideway 3. A piston rod 4 extending along linear guideway 3 inside pressure pipe 1 is securely connected to piston 2. Piston 2 and piston rod 4 may be two parts (FIGS. 1 to 3) or of one piece (FIGS. 4, 5). A rod portion 5 of piston rod 4 projects beyond a first pressure pipe end, in particular at first guideway end 11. A connection point 6 at which the piston rod can be connected to a lifting gear (not shown) is provided on said rod portion 5. As shown in the Figures, connection point 6 may be in the form of a lug for receiving a part of the lifting gear. Piston 2 and piston rod 4 are connected force-lockingly at connection point 6 to the lifting gear which translates the movement of the piston into the required lifting movement of the engine hood. Connection point 6 may be integrally molded onto the end of the piston rod.

A second connection point 7 is provided on pressure pipe 1 at the second guideway end 12 located opposite the first guideway end 11. This second connection point 7 is designed for force-locking support of the pressure pipe 1 on the vehicle body, in particular on a vehicle part located underneath the engine hood. As shown in the Figures, the second connection point 7 may likewise be in the form of a lug which can force-lockingly receive a support member on the vehicle body.

The second connection point 7 can be securely connected by a fitting part 13 to pressure pipe 1. Connection points 6 and 7 are arranged in such a way that they are aligned with the linear extension of guideway 3 of pressure pipe 1. They are arranged in line with the linear extension of guideway 3 of pressure pipe 1.

Figure 3:
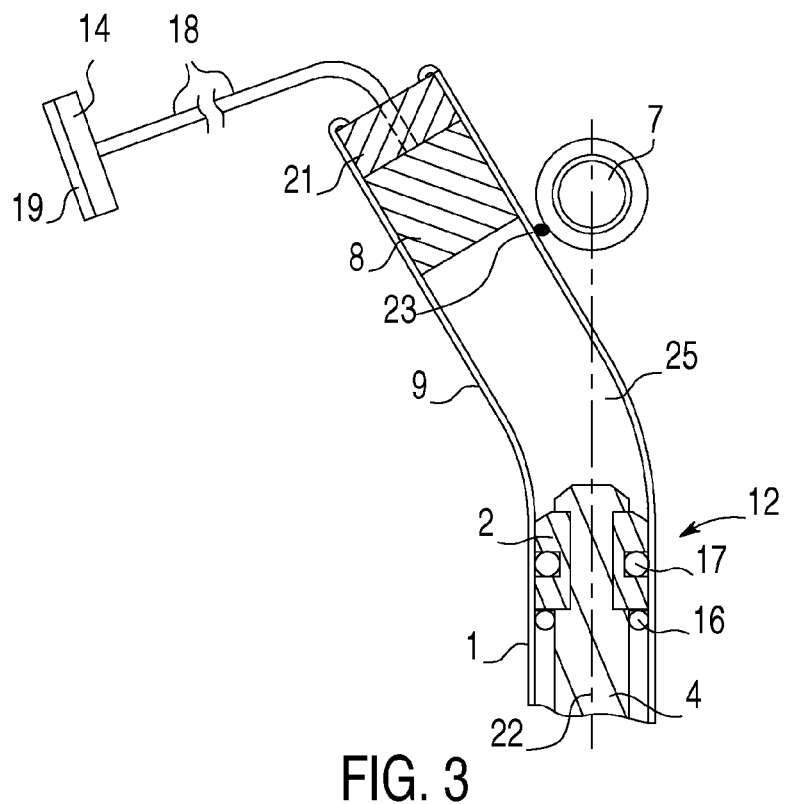
FIG. 3 shows a partial cross-sectional view of a second embodiment of the drive device.

However, the second connection point may also be attached in the immediate vicinity of the angled pressure pipe portion 9, as is shown in FIG. 3. It is preferably attached by welding, in particular by butt welding to a welding point 23 in the region of the angled pressure pipe portion, as shown in FIG. 3. CD (capacitor discharge) welding can also be used, preferably. In this embodiment also, the center of connection point 7 is aligned with the linear extension of guideway 3 of pressure pipe 1 and pipe axis 22. Connection point 7 can preferably be a blanked part in the form of a lug.

A drive gas is supplied by a gas source 8 to drive piston 2 along linear guideway 3. Piston 2 contacts the inner surface of pressure pipe 1 pressure-tightly by means of a sealing ring 17, for example by means of an O-ring. Gas source 8 is located in a pressure pipe portion 9 which is bent at an angle to the linear guideway 3 of pressure pipe 1. The interior of the angled pressure pipe portion 9 continues into the interior of linear guideway 3. The drive gas produced by gas source 8 acts on the rear side of piston 2 and moves the latter along guideway 3 in pressure pipe 1.

Piston 2 and piston rod 4 may be made of a fiber/plastic composite material, in particular of a glass fiber/plastic composite material. Said material is used, in particular, when piston rod 4 and piston 2 and connection point 6 are of one-piece construction. However, piston 2 and/or piston rod 4 may also consist of a different, electrically non-conductive material, for example of plastic. It is possible in this way to provide effective electrical insulation between the electrical contact for gas source 8, and the point of connection 6 to the lifting gear. Pressure pipe 1 is preferably made of stainless steel.

Figure 2:
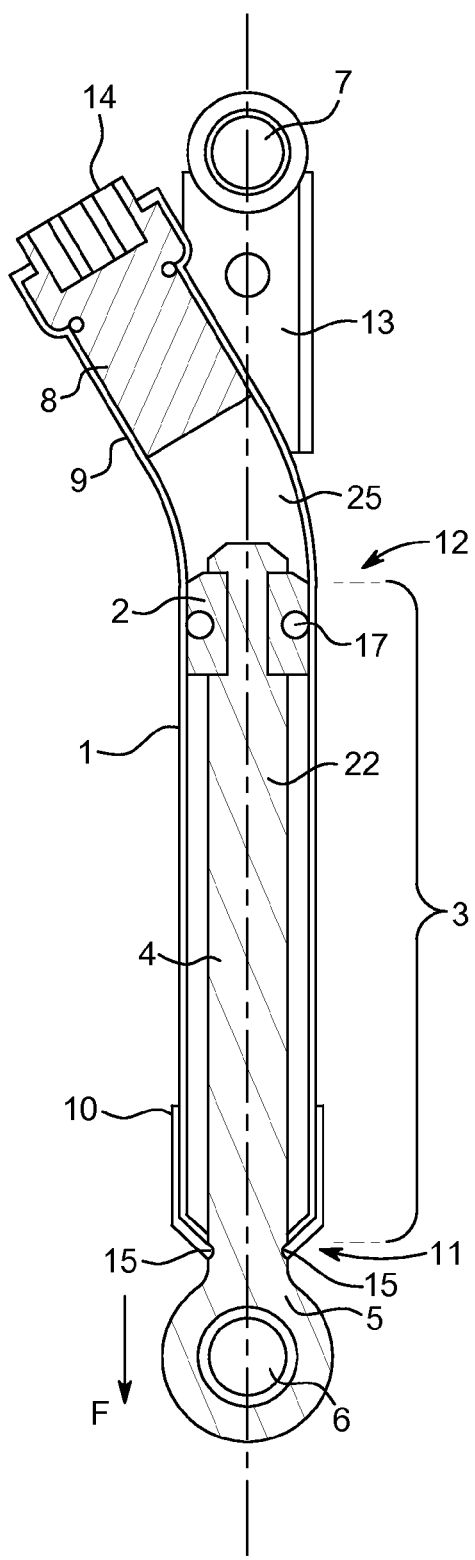
FIG. 2 shows a cross-sectional view along line A-A in FIG. 1.

Gas source 2 is preferably embodied as an electrically ignitable gas generator, in particular as a pyrotechnical gas generator. The gas generator is inserted tightly into the end of angled pressure pipe portion 9. At its free end, there is an electrical plug connection part 14, to which a matching plug connection part 19 connected to an electrical cable 18 can be connected to form an electrical contact. (FIGS. 2 and 4).

In the embodiment shown in FIG. 3, direct electrical contact to gas source 8 is provided by a lead wire connection. This connection consists of a liquid-tight duct 21, through which the current-carrying wires of electrical cable 18 are guided and brought into electrical contact with the electrical ignition device of gas source 8. By crimping or rolling the end of angled pressure pipe portion 9, the liquid-tight duct, which preferably consists of a suitable plastic material, is securely inserted into the end of the pipe. The other end of electrical cable 18 is connected to the power source (not shown) on the vehicle at a suitable location by means of a plug connection consisting of plug connection parts 14 and 19.

As can be seen from FIG. 4, the electrical contacting point on gas source 8 can be sealed liquid-tightly against its surroundings. A liquid-tight sleeve 20, which liquid-tightly encloses the two plug connection parts 14 and 19 of the contacting point, is used for this purpose. The connection point of electrical cable 18 to plug connection part 19 can also be enclosed by sleeve 20. Such a liquid-tight sleeve may also be provided for the lead wire connection in the embodiment shown in FIG. 3. This prevents splash water from entering the device when cleaning the engine.

At the opposite end of pressure pipe 1 there is a sealing cap 10. This sealing cap 10 is securely connected to projecting rod portion 5, for example by a positive engagement 15. Sealing cap 10 may preferably be made of an elastic material and be disposed with a press fit on the end portion of pressure pipe 1. The press fit on pressure pipe 1 has a weaker connecting force than the connecting force between rod portion 5 and sealing cap 10, for example in the form of a positive engagement or form closure 15. When piston 2 is being driven, sealing cap 10 is therefore released from pressure pipe 1 and moves along with piston rod 4. A driving force F is thus transferred in a torque-free manner onto the lifting gear (not shown) for the engine hood. The direction of the force vector corresponds to the linear extension of guideway 3, with which the two connection points 6 and 7 are aligned.

A braking path for the driven piston 2 can be formed before guideway end 11 of linear guideway 3 by narrowing the interior cross-section of pressure pipe 1. The interior cross-section can be narrowed by conically tapering the pressure pipe around its entire circumference, for example, or at certain points around the pipe axis. This prevents separation of the individual parts in the event of gas source 8 being accidentally activated, and prevents the piston, in particular, from leaving the pressure pipe.

As shown in the embodiments in FIGS. 3 to 5, a stop ring 16 which performs a motion-damping function when the driven piston 2 is stopped at its forward end position (FIG. 5) is disposed at the front end of piston 2, in the drive direction. Stop ring 16 may be made of a pliable material, for example rubber or plastic, and may be in the form of an O-ring. When stop ring 16 is stopped in a motion-damping manner at the end of the pipe, stop ring 16 abuts a tapered portion at guideway end 11 of the pressure pipe. As can be seen from FIG. 5, this narrowing may transition continuously into a rounded portion 24 at the end of pressure pipe 1. The rounded portion 24 at the end of the pipe is in contact with piston rod 4. This rounded portion 24 at the end of the pipe prevents the end of the pipe from cutting into the material of piston rod 4 when piston rod 4 is tilted relative to linear guideway 3 or relative to pipe axis 22. Possible tilting of piston rod 4 relative to pipe axis 22 is indicated by a dashed line 25 in FIG. 5. In this forward end position of driven piston 2, stop ring 16 is pressed, with a damping and braking effect on the driven motion of piston 2, into the slope of the tapering pipe, which transitions continuously into rounded portion 24. In the end position, there remain a supporting length x, along which piston 2 and piston rod 4 remain supported against pressure pipe 1. Rounded portion 4 allows piston 2 to be pushed back toward its starting position after ventilation.

Figure 6:
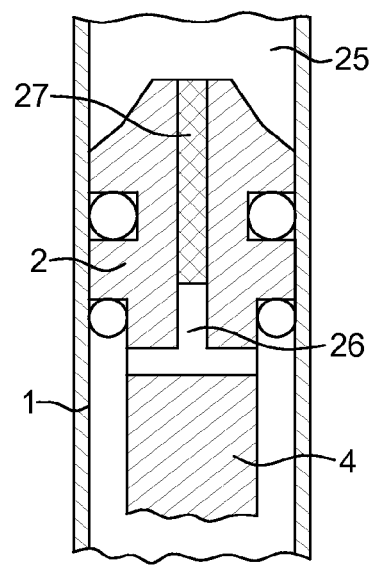
FIG. 6 shows another embodiment.

In the embodiment shown in FIG. 6, an overpressure valve is provided in piston 2 for venting work chamber 25 between gas source 8 and piston 2 in a bonfire test, so called. For that purpose, a gas passage 26 extending from work chamber 25 into the interior of pressure pipe 1 at the front end of piston 2 is provided inside piston 2. Gas passage 26 is normally plugged by a sealing plug 27. Said sealing plug 27 consists of a material with a melting point between 130° C. and 150° C. A high-temperature wax is preferably used as the material for sealing plug 27. A suitable wax called Baerolub® is available on the market and has a melting point of 142° C. to 145° C. Gas passage 26 consists substantially of an axially extending through bore in piston 2 and a through bore extending perpendicularly thereto at the end of piston rod 4 adjacent the piston.

When the drive device is subjected to the bonfire test, pressure pipe 1 and piston 2 heat up, depending on the position of the flame, and sealing plug 27 melts and flows out of gas passage 26. When gas source 8 is ignited at approximately 170° C., gas passage 26 is open and forms a vent which is open from work chamber 25 as far as the interior of pressure pipe 1 in front of piston 2. This significantly reduces the amount of energy driving the piston.

Figure 7:
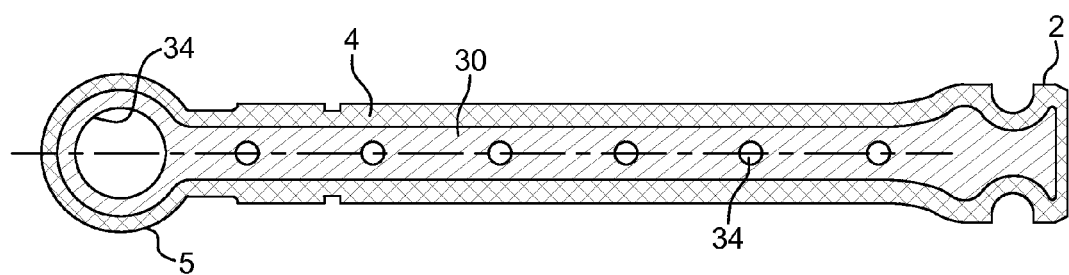
FIG. 7 shows a longitudinal cross-section through a piston with piston rod and connection point according to a further embodiment of the invention.

FIG. 7 shows a further embodiment of piston 2 and piston rod 4. In this embodiment, piston 2 and piston rod 4 are of one-piece construction, with plastic, preferably a fiber/plastic composite, being used as the material. The combination of piston 2 and piston rod 4 also has a core 30 which is made of a metal, preferably steel, and which is disposed coaxially with the longitudinal axis of the combination of piston 2 and piston rod 4 in such a way that it completed enclosed by the plastic material. As can be seen from FIG. 7, core 30 extends over the entire length of the combination of piston 2 and piston rod 4. Core 30 follows the outer contours of piston 2, piston rod 4 and connection point 5. Core 30 likewise follows the contours of connection point 5, i.e., core 30 likewise forms a lug 32. To form a secure connection between the plastic material for piston 2 and piston rod 4, core 30 has through holes 34 along the longitudinal axis of the combination of piston 2 and piston rod 4, with which through holes 34 the plastic material can engage.

LIST OF REFERENCE SIGNS

1 Pressure pipe
2 Piston
3 Guideway
4 Piston rod
5 Rod portion
6, 7 Connecting points
8 Gas source (gas generator)
9 Angled pressure pipe portion
10 Sealing cap
11 Guideway end
12 Guideway end
13 Fitting part
14 Plug connection portion
15 Positive engagement
16 Stop ring
17 Sealing ring
18 Electric cable
19 Plug connection portion
20 Liquid-tight sleeve
21 Liquid-tight duct
22 Pipe axis
23 Welding point
24 Rounded portion
25 Work chamber
26 Gas passage
27 Sealing plug
30 Core
32 Lug
34 Through hole

The invention claimed is:
1. A drive device for lifting a vehicle engine hood to protect pedestrians, said drive device comprising
a pressure pipe in which a piston which can be driven by a drive gas can be moved along a linear guideway,
a piston rod connected to said piston, said piston rod having a connection point to be connected force-lock- ingly to a lifting gear for the engine hood at a rod portion projecting beyond a first guideway end of the pressure pipe, a second connection point disposed at the second guideway end located opposite the first guideway end, for force-locking support of the pressure pipe on the vehicle body, wherein said two connection points are arranged at the pressure pipe in line with the linear guideway of the piston, and a gas source supplying the drive gas, said gas source being disposed in a pressure pipe portion which is at an angle to the linear guideway wherein a sealing cap is connected by positive engagement to the rod portion projecting beyond the first guideway end of the pressure pipe and is disposed on the first guideway end of the pressure pipe with a press fit that is releasable during piston operation.

2. The drive device according to claim 1 wherein a braking path formed by narrowing the cross-section of the pressure pipe is provided for the driven piston in front of the first guideway end in the drive direction of the piston.

3. The drive device according to claim 2, wherein the cross-sectional narrowing of the pressure pipe transitions continuously into the rounded portion of the pressure pipe end.

4. The drive device according to claim 1, wherein the pressure pipe is curved or rolled at the first guideway end and at the end of the angled pressure pipe portion.

5. The drive device according to claim 1, wherein the gas source is designed as an electrically ignitable gas generator.

6. The drive device according to claim 5, wherein a plug connection is provided for electrically contacting the gas source.

7. The drive device according to claim 5, wherein the gas source is electrically contacted by means of a lead wire.

8. The drive device according to claim 5, wherein the electrical contacting point at the gas source is sealed liquid-tightly.

9. The drive device according to claim 1, wherein the gas source is designed as a pyrotechnical gas generator.

10. The drive device according to claim 1, wherein the second connection point is securely connected by a fitting part to the angled pressure pipe.

11. The drive device according to claim 1, wherein the second connection point is fixed in the immediate vicinity of the angled pressure pipe portion.

12. The drive device according to claim 1, wherein the second connection point is fixed by welding in the region of the angled pressure pipe portion.

13. The drive device according to claim 1, wherein the second connection point is in the form of a blanked part.

14. The drive device according to claim 1, wherein the pressure pipe is made of stainless steel.

15. The drive device according to claim 1, wherein the piston and the piston rod are of one piece.

16. The drive device according to claim 15, wherein the piston and the piston rod of one-piece construction are made of plastic.

17. The drive device according to claim 16, wherein the plastic is a fiber/plastic composite material.

18. The drive device according to claim 1, wherein the piston and the piston rod of one-piece construction are made of plastic with a core, said core being made of a metal, preferably of steel.

19. The drive device according to claim 1, wherein the piston and/or the piston rod is/are made of an electrically non-conductive material.

20. The drive device according to claim 1, wherein a stop ring is arranged around the piston rod is provided at the front end of the piston in the drive direction.

21. The drive device according to claim 20, wherein the stop ring is designed to be at least motion damping when the driven piston is at its forward end position.

22. The drive device according to claim 1, wherein the pressure pipe end is rounded at the first guideway end.

23. A drive device for lifting a vehicle engine hood to protect pedestrians, said drive device comprising a pressure pipe in which a piston which can be driven by a drive gas can be moved along a linear guideway, a piston rod connected to said piston, said piston rod having a connection point to be connected force-lockingly to a lifting gear for the engine hood at a rod portion projecting beyond a first guideway end of the pressure pipe, a second connection point disposed at the second guideway end located opposite the first guideway end, for force-locking support of the pressure pipe on the vehicle body, wherein said two connection points and are arranged at the pressure pipe in line with the linear guideway of the piston, and a gas source supplying the drive gas, said gas source being disposed in a pressure pipe portion which is at an angle to the linear guideway;

wherein a gas passage is provided in the piston, said gas passage extending from the working chamber between the gas source and the piston to the interior of the pressure pipe at the front end of the piston in the drive direction, and that the gas passage is blocked by means of a sealing plug which melts between 130° C. and 150° C.

* * * * *